US008332096B2

(12) United States Patent  
Riegelman et al.

(10) Patent No.: US 8,332,096 B2
(45) Date of Patent: Dec. 11, 2012

(54) METHOD AND A SYSTEM FOR PROVIDING A DRIVING-RANGE FORECAST FOR A VEHICLE

(75) Inventors: Alexander Thomas Riegelman, Berkley, MI (US); Michael Joseph Levy, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 261 days.

(21) Appl. No.: 12/817,595

(22) Filed: Jun. 17, 2010

(65) Prior Publication Data

US 2011/0313610 A1  Dec. 22, 2011

(51) Int. Cl.
G01M 17/00 (2006.01)
G06F 7/00 (2006.01)
G06F 19/00 (2011.01)

(52) U.S. Cl. ..................................... 701/34.4
(58) Field of Classification Search ................ 701/34.4, 701/22

See application file for complete search history.

(56) References Cited

U.S. PATENT DOCUMENTS

| 2002/0188387 | A1* | 12/2002 | Woestman et al. | 701/22 |
| 2008/0125958 | A1* | 5/2008 | Boss et al. | 701/123 |
| 2009/0014460 | A1* | 1/2009 | Kobus et al. | 221/135 |
| 2010/0094496 | A1* | 4/2010 | Hershkovitz et al. | 701/22 |
| 2010/0131139 | A1* | 5/2010 | Sakai et al. | 701/22 |
| 2010/0153038 | A1* | 6/2010 | Tomura et al. | 702/63 |
| 2011/0156652 | A1* | 6/2011 | Kishiyama et al. | 320/132 |
| 2011/0246005 | A1* | 10/2011 | King et al. | 701/22 |

* cited by examiner

Primary Examiner — James Trammell
Assistant Examiner — Michael D Lang
(74) Attorney, Agent, or Firm — Quinn Law Group, PLLC

(57) ABSTRACT

A method of providing a forecast of a driving-range of a vehicle employing an energy storage device is disclosed. The method includes determining a state of charge (SOC) of the energy storage device, accessing geographical and road map data from a remote source, and calculating a historical average distance traveled by the vehicle per the determined SOC. The method also includes determining an available driving-range according to map data and determined historical average distance traveled by the vehicle per the determined SOC. Furthermore, the method includes charging the energy storage device, establishing a rate of charge of the device, determining a period of time and an increase in the SOC to be achieved during the period of time. The method additionally includes determining incremental change in available driving-range according to geographical and road map data and historical average distance traveled by the vehicle per the predetermined increase in the SOC.

20 Claims, 3 Drawing Sheets

METHOD AND A SYSTEM FOR PROVIDING A DRIVING-RANGE FORECAST FOR A VEHICLE

TECHNICAL FIELD

The invention relates to a method and a system for providing a driving-range forecast for a vehicle.

BACKGROUND OF THE INVENTION

Vehicles employ various power-sources for propulsion. Such power-sources may include an internal combustion engine and/or one or more electric motors or a fuel-cell.

Each of such power-sources typically requires an energy storage device to receive and store an energy charge, and to supply the stored energy in order to sustain operation of that power-source. For example, a fillable tank may be employed for supplying fuel to run the internal combustion engine or the fuel-cell, and a chargeable electrical battery may be employed for supplying current to run an electric motor.

A specific degree of the energy storage device's energy charge generally supplies the vehicle with a finite driving-range. Such a driving-range typically depends on a number of factors which may be related to the vehicle itself, as well as to road and weather conditions. A vehicle operator's driving style may also influence the vehicle's available driving-range on a specific degree of charge.

SUMMARY OF THE INVENTION

A first embodiment is a method of providing a forecast of a driving-range of a vehicle employing an energy storage device. The method includes determining a state of charge (SOC) of the energy storage device and accessing geographical and road map data from an external or remote source. The method also includes calculating a historical average distance traveled by the vehicle per the determined SOC, and determining an available driving-range according to the map data and the determined historical average distance traveled by the vehicle per the determined SOC. Additionally, the method includes charging the energy storage device, and establishing a rate of charge of the energy storage device. Furthermore, the method includes determining a period of time and an increase in the SOC to be achieved during the period of time, or determining an additional period of time needed to generate a predetermined increase in the SOC. Moreover, the method includes determining an incremental change in the available driving-range according to the geographical and road map data, and the historical average distance traveled by the vehicle per one of the determined increase in the SOC and the predetermined increase in the SOC.

The method may additionally include accessing road conditions and weather data from a remote source. In such a case, determining an available driving-range and determining an additional driving-range are further performed according to the accessed road conditions and weather data. The act of accessing road conditions and weather data may be accomplished via a satellite connection. Additionally, the act of accessing geographical map data may also be accomplished via a satellite connection. Furthermore, determining an available driving-range and determining an incremental change in the available driving-range may each be accomplished via a trip-planning algorithm programmed into a controller.

The method may additionally include displaying the additional driving-range, as well as displaying the predetermined period of time needed to generate the additional driving-range. According to the method, each of the determined available driving-range and additional driving-range may reflect 360 degrees of a real-world range. The energy storage device may be at least one of a battery (such as for supplying electrical energy to an electric motor) and a fuel tank (such as for supplying appropriate fuel to an internal combustion engine or to a fuel-cell).

A second embodiment is a system for providing a forecast of a driving-range of a vehicle. The system includes a power-source configured to propel the vehicle, an energy storage device configured to supply energy to the power-source, and a controller. The controller is configured for determining an SOC of the energy storage device, accessing geographical map data, and determining a historical average distance traveled by the vehicle per the determined degree of charge. The controller is also additionally configured for determining an available driving-range according to the map data and the determined historical average distance traveled by the vehicle per the determined degree of charge, and determining a rate of charge of the energy storage device. The controller is additionally configured for determining one of an increase in the SOC to be achieved during a predetermined period of time and an additional period of time needed to generate a predetermined increase in the SOC. Furthermore, the controller is configured for determining an incremental change in the available driving-range according to the map data and the historical average distance traveled by the vehicle per one of the determined increase in the SOC and the predetermined increase in the SOC.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
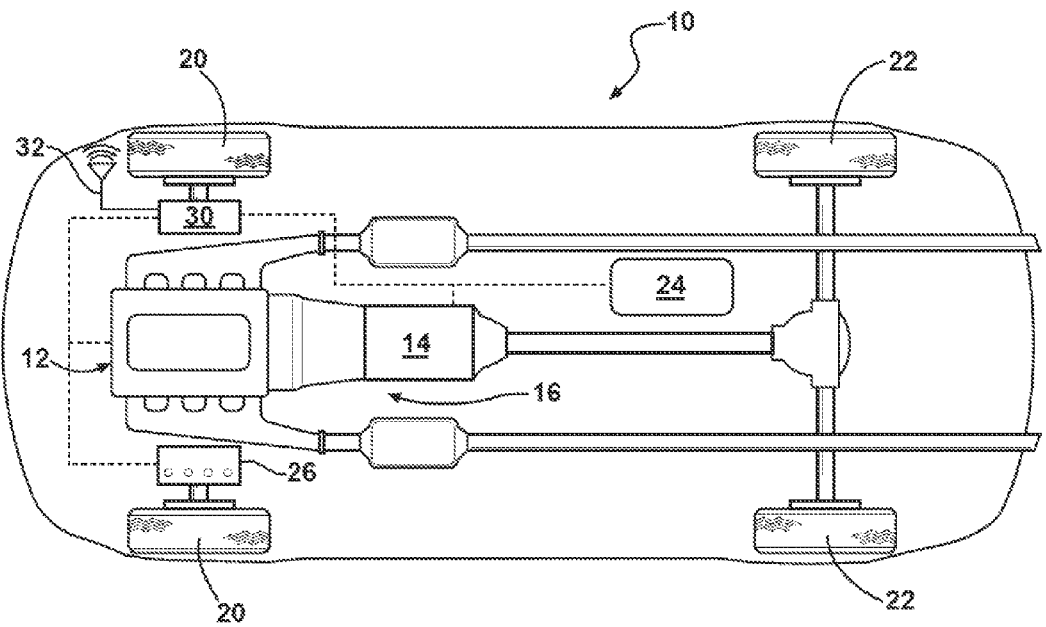
FIG. 1 is a schematic plan view of a hybrid electric vehicle having an internal combustion engine supplied with fuel from an energy storage device (a fuel tank) and a motor/generator supplied with energy from another energy storage device (a battery)
Figure 1A:
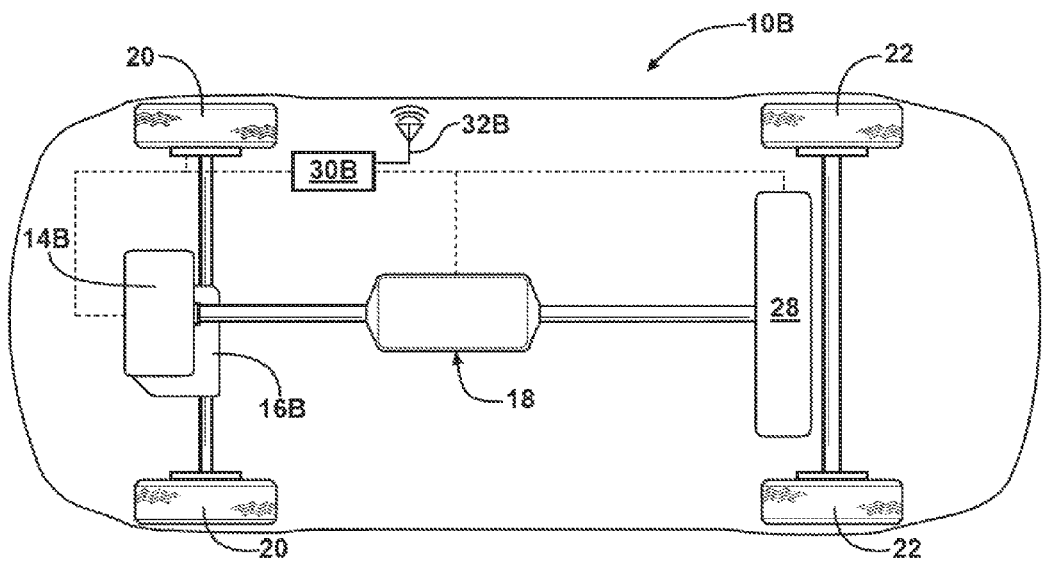
FIG. 1A is a schematic plan view of a fuel-cell hybrid electric vehicle having an electric motor, and a fuel cell supplied with fuel from an energy storage device (a fuel tank)

Referring to the drawings, wherein like reference numbers refer to like components, FIGS. 1 and 1A show a schematic view of a vehicle 10, which is depicted as a hybrid electric vehicle (HEV). As shown, vehicle 10 includes multiple power-sources, i.e., an internal combustion engine 12, such as a spark- or a compression-ignition type, and a motor/generator 14. Motor/generator 14 is shown incorporated into a transmission 16, but may also be situated external to the transmission, as understood by those skilled in the art.

Although vehicle 10 is shown as an HEV, a conventional powertrain (not shown) including solely engine 12, or a yet another type of a hybrid powertrain including engine 12B and a fuel-cell 18 (shown in FIG. 1A) are also envisioned. Engine 12 and motor/generator 14, either alone or in combination, are adapted for driving wheels 20 and/or wheels 22 via transmission 16 to propel vehicle 10. Although only one motor/generator 14 is shown, a plurality of motor/generators is also within the scope of the present disclosure. A vehicle 10B is shown in FIG. 1A. Vehicle 10B includes an electric motor 14B and a fuel-cell 18 for supplying energy to the electric motor. Electric motor 14B and a fuel-cell 18 are shown as adapted for driving wheels 20 via transmission 16B, but configurations of a fuel-cell hybrid in which wheels 22 are driven with or without wheels 20 are also envisioned.

Whether the subject vehicle is the hybrid electric vehicle 10 of FIG. 1, a fuel-cell hybrid 10B of FIG. 1A, or a vehicle having a conventional powertrain employing solely engine 12, each of the power-sources, 12, 14, 14B and 18, requires at least one energy storage device that supplies energy to run the respective power-source. A refillable fuel tank 24 is an energy storage device arranged to supply energy in the form of appropriate fuel, such as gasoline, diesel or natural gas, to power the internal combustion engine 12. A battery 26 is an electrical energy storage device. Although battery 26 is useful for providing electrical energy to engine 12 for initiating combustion, the battery is also configured to supply electrical energy to power motor/generator 14. As shown in FIG. 1A, a refillable fuel tank 28 is an energy storage device arranged to supply an appropriate reactant fuel, such as hydrogen, to fuel-cell 18, while a reactant oxidant, such as air, may be provided from the surrounding environment.

Conventional electrochemical cell battery 26 stores electrical energy chemically, and hence represents a thermodynamically closed system. By contrast, fuel-cell 18 consumes the reactant from an external source, fuel tank 28, and is therefore a thermodynamically open system. While battery 26 may be recharged either via an alternator (not shown), or via motor/generator 14 operating in generator mode, as well as from an external source, such as an electrical grid, fuel tanks 24 and 28 must be recharged or replenished from dedicated sources external to the subject vehicle. A particular degree of charge of any of the energy storage devices 24, 26, and 28 is capable of providing a finite driving-range for the subject vehicle. Among a number of factors influencing vehicle efficiency, and therefore the vehicle's driving-range, vehicle operator's driving style, weather, and traffic conditions play critical roles. Therefore, historical data regarding the average distance traveled per a specific degree of charge of the energy storage device 24, 26, and/or 28, is an important measure in assessing the available vehicle driving-range.

Real-world driving-range for a vehicle is additionally assessed in light of geographical and road map data, such as actual roadway layout and construction areas, set speed limits, number of stop-light and stop-sign controlled intersections, current weather and road conditions, and various other factors. Such various geographical and road map factors may be accessed from a remote source, such as a satellite (not shown) via a satellite connection 32 (FIG. 1) or 32B (FIG. 1A), and communicated to the vehicle controller 30 (FIG. 1) or 30B (FIG. 1A). Controller 30 or 30B is configured to regulate operation of power-sources 12, 14, and/or 18, while determining or staying up to date regarding the current state of charge (SOC) of the energy storage devices 24, 26, and/or 28. Based on the data described above, controller 30 determines available real-world driving-range and communicates the determined driving-range for display on a visual screen 34, shown in FIG. 2, situated in the passenger compartment (not shown) of vehicle 10 or 10B. The display 34 of the determined driving-range reflects 360 degrees of real-world range according to the geographical and road map based on the vehicle's starting, i.e., then current, geographical position.

Controller 30 or 30B is configured to determine a rate of charge of the subject energy storage device(s), if particular energy storage devices 24, 26, and/or 28 are in the process of being charged. Controller 30 or 30B is also configured to determine either an additional degree, such as a percentage, of charge to be gained during a predetermined period of charging time, or an additional period of charging time needed to generate a predetermined degree of charge. Additionally, controller 30 or 30B is configured to determine an incremental change in the available driving-range according to the geographical and road map data and the historical average distance traveled by the vehicle per the additional degree of charge. A trip-planning algorithm is programmed into the controller 30 or 30B to enable the controller to determine the available driving-range and the incremental change in the available driving-range according to various factors, such as those listed above.

Figure 2:
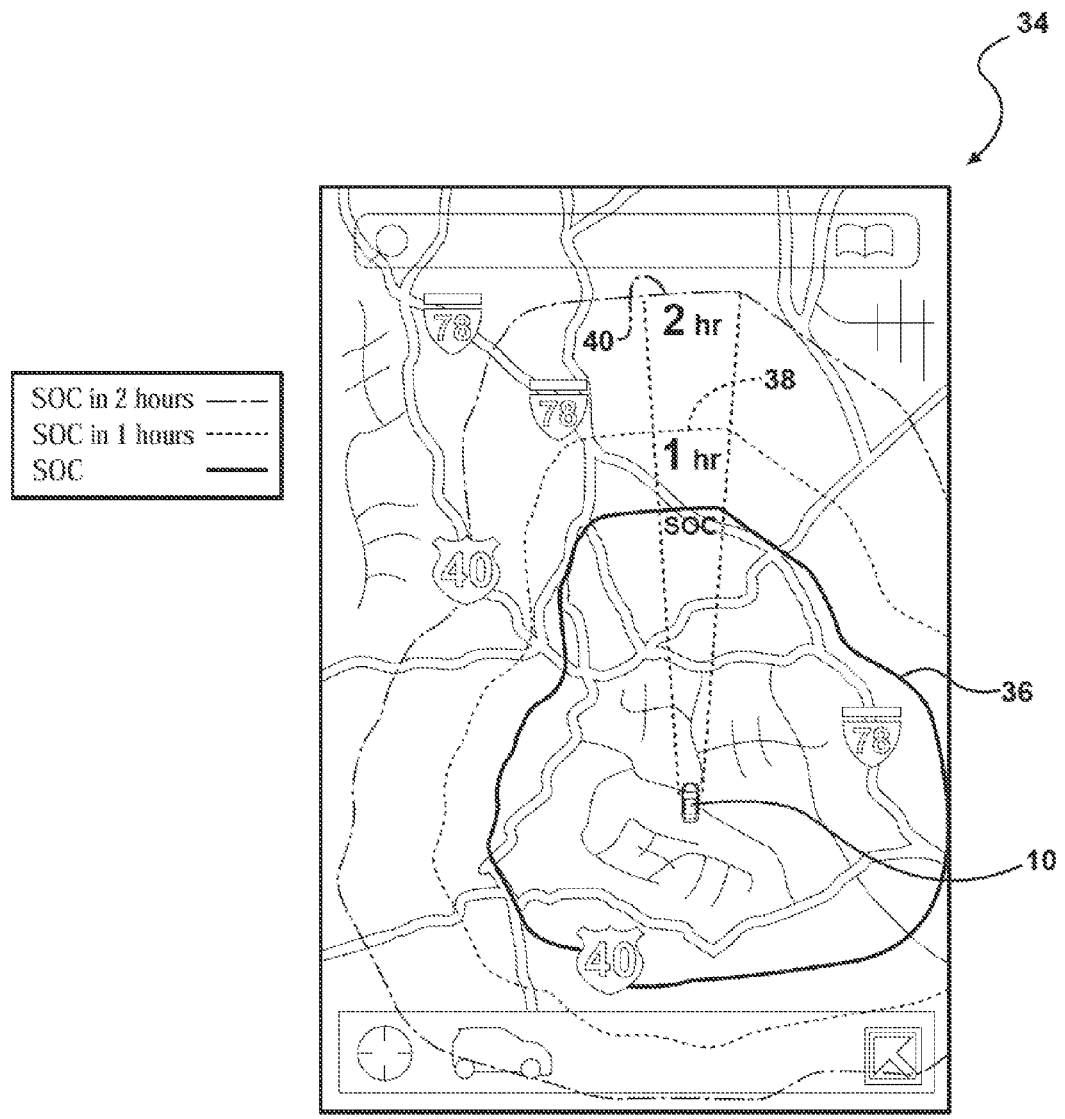
FIG. 2 is an illustration of a display of a vehicle driving-range, including a baseline driving-range and a projected incremental driving-range to be achieved with additional units of charge for any of the energy storage devices of FIGS. 1 and 1A.

Following the determination of the incremental change in the available driving-range, controller 30 communicates the determined incremental change in the available driving-range for display on the visual screen 34, as shown in FIG. 2. For clarity and convenience, visual screen 34 may distinguish between the available baseline driving-range at the current SOC and the incremental change in the available driving-range due to increased SOC in a variety of ways, such as by displaying the distinct ranges in different color and/or with different shading. Displaying the baseline and the incremental change in the available driving-range provides a visual forecast of the driving-range of any of the vehicles depicted in FIGS. 1 and 1A. Visual screen 34 may be provided within a passenger compartment (not shown) of the subject vehicle. Additionally, visual screen 34 may be a monitor attached to the vehicle operator's personal computer, and/or a display screen on the operator's cellular telephone. In such situations, the driving-range information may be communicated to the vehicle operator's personal computer and/or to the operator's cellular telephone via the internet for remote display. Such a visual forecast of the available driving-range is intended to be used by the vehicle operator to decide on the efficacy of waiting for incremental charging of the energy storage device versus commencing toward a selected destination at the current SOC.

FIG. 2 depicts, via visual screen 34 an available driving-range 36 at the baseline or current SOC, a projected incremental driving-range 38 at an SOC following 1 unit of charging time, and a projected incremental driving-range 40 at an SOC following 2 units of charging time. In the case of vehicle 10 or 10B, each unit of charging time for battery 26 may represent a specific number of hours. Additionally, a predetermined degree of charge may be chosen, such as a percentage of charge capacity of battery 26, and the additional driving-range may be displayed as a function of the predetermined degree of charge. In the case of a conventional vehicle employing solely engine 12 or in the case of vehicle 10B of FIG. 1A, visual screen 34 may display an incremental change in the driving-range per an additional predetermined unit of fuel, such as an additional gallon or liter of gasoline or hydrogen. Visual screen 34 includes real-world map data, and takes into account road data such as twists and turns of actual streets, speed limits, and road construction in progress. Such real-world, real-time map data, as well as pertinent weather conditions, is most effectively accessed by satellite connection 32 or 32B to the global positioning system (GPS), a satellite-based navigation system, as understood by those skilled in the art.

Figure 3:
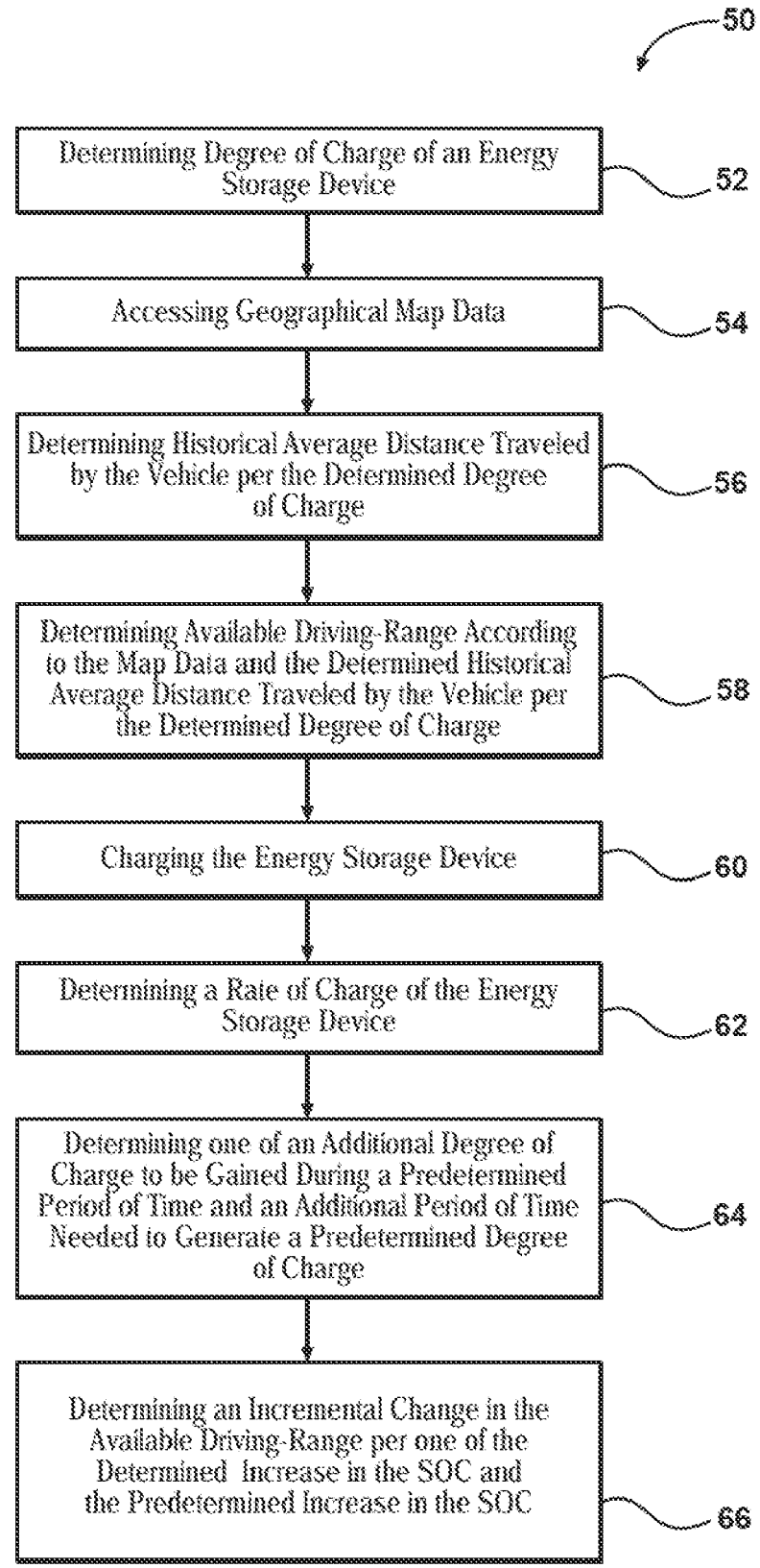
FIG. 3 is a flow chart illustrating a method for providing a forecast of the driving-range of the vehicles depicted in FIGS. 1 and 1A and illustrated in FIG. 2.

FIG. 3 depicts a method 50 of providing a forecast of a driving-range of a vehicle, such as vehicle 10 (shown in FIG. 1) or 10B (shown in FIG. 1A), employing at least one of energy storage devices 24, 26, and 28. The method commences in frame 52, where the SOC of one or more energy storage devices 24, 26, and 28 is determined. Following frame 52, the method proceeds to frame 54 where the geographical and road map data accessed via controller 30 or 30B from an external or remote source, such as an earth orbiting satellite. After frame 54, the historical average distance traveled by the vehicle per the determined degree of charge is determined via controller 30 or 30B in frame 56.

Following frame 56, and based on at least the determined data in frames 52-56, the available driving-range is determined in frame 58. After frame 58, the method proceeds to frame 60, where the energy storage device charging is commenced. In frame 62, the method determines the rate of charge of the energy storage device 24, 26, and/or 28. Following frame 62, the method determines either the increase in the SOC to be achieved during a predetermined period of time, or the additional period of time needed to generate the predetermined increase in the SOC in frame 64. As described above with respect to FIG. 2, the increase in SOC may be one or more gallons or liters of fuel for fuel tank 24 or 28, or a percentage of charge capacity of battery 26.

The method terminates in frame 66, where the incremental change in the available driving-range is established according to the geographical and road map data and the historical average distance traveled by the vehicle per either the determined increase in the SOC or the predetermined increase in the SOC. Thus, method 50 provides a forecast of the available driving-range both at the baseline, current SOC of the energy storage device 24, 26, and/or 28, and a projection of the available incremental driving-range per the additional degree or unit of charge. As described with respect to FIG. 2, such a forecast may be displayed on the visual screen 34 to facilitate informed decision-making by the vehicle operator regarding whether to wait for additional charge of the vehicle's energy storage device, or commence toward a selected destination at the current SOC.

While the best modes for carrying out the invention have been described in detail, those familiar with the art to which this invention relates will recognize various alternative designs and embodiments for practicing the invention within the scope of the appended claims.

The invention claimed is

1. A method of providing a forecast of a driving-range of a vehicle employing an energy storage device, the method comprising:
   determining a state of charge (SOC) of the energy storage device;
   accessing geographical and road map data from a remote source;
   calculating a historical average distance traveled by the vehicle per the determined SOC;
   determining an available driving-range according to the geographical and road map data and the determined historical average distance traveled;
   charging the energy storage device;
   establishing a rate of charge of the energy storage device;
   determining one of an increase in the SOC to be achieved during a predetermined period of time and an additional period of time needed to generate a predetermined increase in the SOC; and
   determining an incremental change in the available driving-range according to the geographical and road map data and the historical average distance traveled per one of the determined increase in the SOC and the predetermined increase in the SOC.

2. The method according to claim 1, further comprising accessing road conditions and weather data from a remote source.

3. The method according to claim 2, wherein each of said determining an available driving-range and said determining an incremental change in the available driving-range is further performed according to the accessed road conditions and weather data via a trip-planning algorithm programmed into a controller.

4. The method according to claim 1, further comprising displaying the incremental change in the available driving-range on a visual screen.

5. The method according to claim 1, further comprising displaying the predetermined period of time needed to generate the incremental change in the available driving-range on a visual screen.

6. The method according to claim 1, wherein each of the determined available driving-range and the determined incremental change in the available driving-range reflects 360 degrees of a real-world range.

7. The method according to claim 1, wherein the energy storage device is at least one of a battery and a fuel tank.

8. A system for providing a forecast of a driving-range of a vehicle, the system comprising:
   a power-source configured to propel the vehicle;
   an energy storage device configured to supply energy to the power-source; and
   a controller configured for:
      determining a state of charge (SOC) of the energy storage device;
      accessing geographical and road map data from a remote source;
      calculating a historical average distance traveled by the vehicle per the determined SOC;
      determining an available driving-range according to the geographical and road map data and the determined historical average distance traveled;
      establishing a rate of charge of the energy storage device;
      determining one of an increase in the SOC to be achieved during a predetermined period of time and an additional period of time needed to generate a predetermined increase in the SOC; and
      determining an incremental change in the available driving-range according to the geographical and road map data and the historical average distance traveled per one of the determined increase in the SOC and the predetermined increase in the SOC.

9. The system according to claim 8, wherein the controller is further configured for accessing road conditions and weather data from a remote source.

10. The system according to claim 9, wherein the controller determines an available driving-range and the incremental change in the available driving-range according to the accessed road conditions and weather data via a trip-planning algorithm.

11. The system according to claim 8, wherein the controller is further configured to communicate the incremental change in the available driving-range for display on a visual screen.

12. The system according to claim 11, wherein the controller is further configured to communicate the predetermined period of time needed to generate the incremental change in the available driving-range for display on the visual screen.

13. The system according to claim 8, wherein each of the determined available driving-range and the incremental change in the available driving-range reflects 360 degrees of a real-world range.

14. The system of claim 8, wherein the controller is further configured for regulating each of the power-source and the energy storage device.

15. A vehicle comprising:
 a power-source configured to propel the vehicle;
 an energy storage device configured to supply energy to the power-source; and
 a controller configured for:
  determining a state of charge (SOC) of the energy storage device;
  accessing geographical and road map data from a remote source;
  calculating a historical average distance traveled by the vehicle per the determined SOC;
  determining an available driving-range according to the geographical and road map data and the determined historical average distance traveled;
  establishing a rate of charge of the energy storage device;
  determining one of an increase in the SOC to be achieved during a predetermined period of time and an additional period of time needed to generate a predetermined increase in the SOC; and
  determining an incremental change in the available driving-range according to the geographical and road map data and the historical average distance traveled per one of the determined increase in the SOC and the predetermined increase in the SOC.

16. The vehicle according to claim 15, wherein the controller is further configured for accessing road conditions and weather data from a remote source.

17. The vehicle according to claim 16, wherein the controller determines the available driving-range and the incremental change in the available driving-range according to the accessed road conditions and weather data.

18. The vehicle according to claim 15, wherein the controller is further configured to communicate at least one of the incremental change in the available driving-range and the predetermined period of time needed to generate the additional driving-range for display on a visual screen.

19. The vehicle according to claim 15, wherein each of the determined available driving-range and the incremental change in the available driving-range reflects 360 degrees of a real-world range.

20. The vehicle of claim 15, wherein the controller is further configured for regulating each of the power-source and the energy storage device.

* * * * *